Patented Nov. 29, 1932

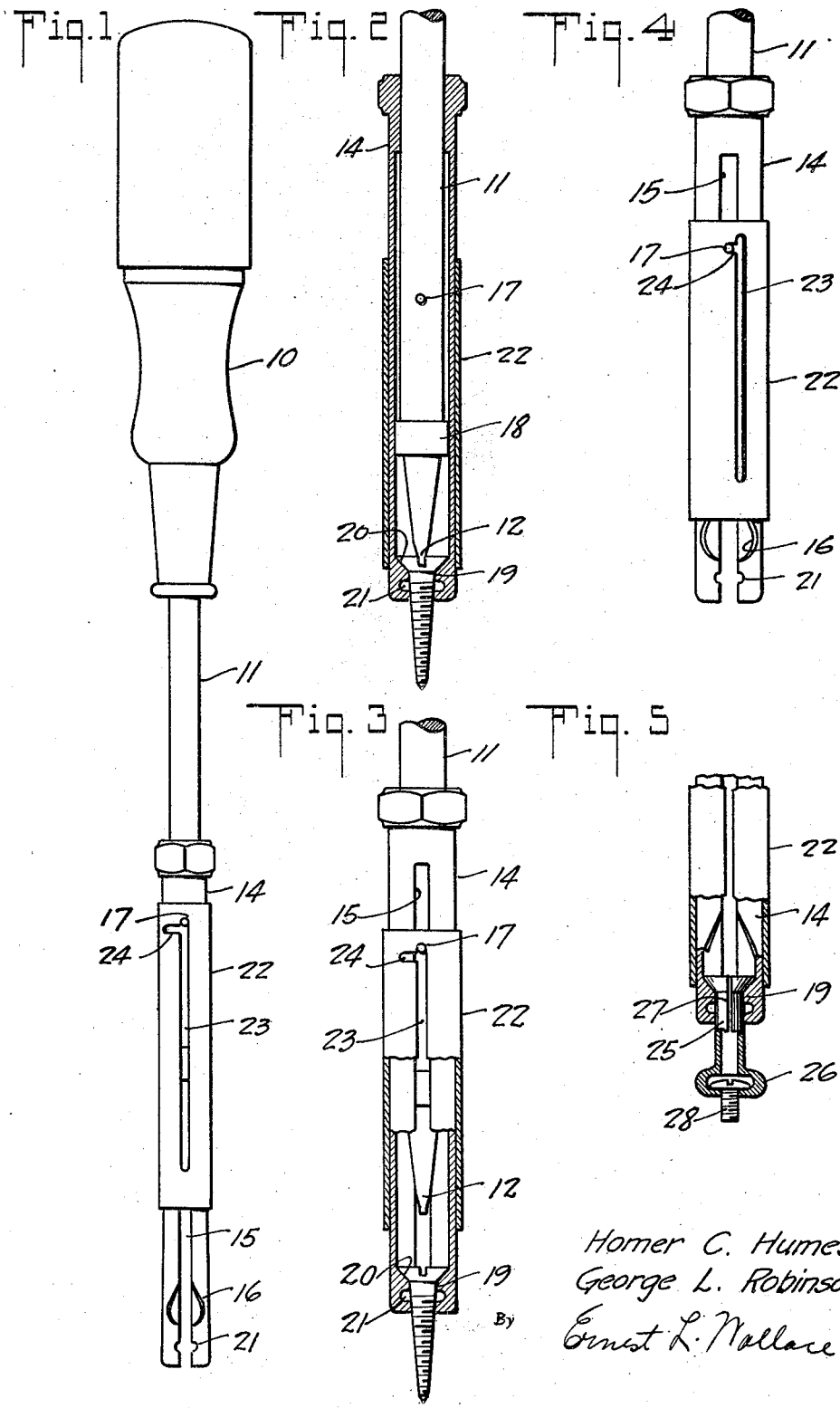

1,889,330

UNITED STATES PATENT OFFICE

HOMER C. HUMES AND GEORGE L. ROBINSON, OF LOS ANGELES, CALIFORNIA

SCREW HOLDING ATTACHMENT FOR SCREW DRIVERS

Application filed February 23, 1932. Serial No. 594,436.

This invention relates to an attachment for screw drivers adapted to hold in steady position the head of a screw or tool having an enlarged head and a shank. It comprises a holding sleeve which is mounted over the shank of a screw driver having an expansible outer end to receive the head and shank of the article to be held. A slip sleeve is mounted over the holding sleeve for contracting the latter to clamping position. The invention also contemplates a species wherein the article may be released by a pull on the screw driver. To this end, a stop is provided on the screw driver which is engageable with the slip sleeve for moving the latter from clamping position. Provision is also made for operating the attachment so as to grip a screw by pushing the screw driver over a screw head. The invention has for its primary object the provision of an attachment of the character described which will hold screws and the like firmly and rigidly to enable starting them under conditions difficult of manipulation and in positions difficult of access. The invention enables one hand operation of the screw driver with tool or article attached and automatic release as desired.

These objects together with other objects and corresponding accomplishments are obtained by means of the embodiment of the invention illustrated in the accompanying drawing, in which:—

Fig. 1 is a side view of a screw driver with our attachment mounted thereon, the attachment being shown in position for insertion of a screw therein; Fig. 2 is a longitudinal section of the attachment with parts in holding position, a screw and a fragment of the screw driver being shown in elevation; Fig. 3 is a side view partly in section showing the parts of the attachment in partially released position; Fig. 4 is a side view of the attachment showing parts of the latter in position for gripping a screw by pressing the screw driver downwardly; and Fig. 5 is a view partly in section and partly in elevation showing the attachment holding a collet for gripping a screw having a half round head.

Referring more particularly to the drawing, a screw driver of the conventional type is shown in Fig. 1. It comprises a handle 10 and a shank 11 with a tip 12 adapted to be inserted in the kerf of a screw. Slidably mounted on the shank 11 is a screw holding sleeve 14 preferably formed of resilient material and slit longitudinally as indicated by 15. The slit extends to the lower end of the sleeve and ends short of the upper end. A similar slit is formed in the sleeve diametrically opposite. The slit 15 is enlarged adjacent its lower end as indicated by 16 to allow the insertion of a screw head from the side. This construction provides a radially expansible sleeve and the sleeve is initially set with its sections sprung outwardly. A stop pin 17 is shown mounted in the shank 11 and extends outwardly therefrom in position to ride in the way formed by slit 15. The bore of the holding sleeve 14 is such as to permit the shank and tip to be moved longitudinally, there being a guide collar 18 to steady the screw driver. The lower end of the bore is reduced in diameter for a substantial distance as indicated by 19 to grip the shank of a screw adjacent the head. The junction 20 of the enlarged and reduced portions is tapered to provide for seating of the heads of countersunk screws. There is also an annular groove 21 cut away at the outer wall as indicated by 22 to permit gripping of the heads of small screws. The sleeve 14 is preferably of uniform outer diameter when contracted.

Slidably mounted over the sleeve 14 is an outer or clamping sleeve 22. The clamping sleeve is arranged so that when in its lower or projected position it will preferably cover the opening 16 and hold the inner sleeve 14 in contracted position. A longitudinal slot 23 accommodates travel of the stop pin 17. A branch slot 24 extends laterally from slot 23 and forms a keeper so that the stop pin may be disposed therein as shown in Fig. 4.

The construction is such that the clamping sleeve 22 may be disposed in the position shown in Fig. 1 with the said clamping sleeve retracted enabling the insertion of a screw laterally into the bore of the holding sleeve. The screw driver is next moved downwardly in the holding sleeve to engage the screw head and the clamping sleeve is then projected downwardly to the position shown in Fig. 2, contracting the holding sleeve so as to firmly grip the shank of the screw. The screw driver is pressed against the head of the screw and on rotation will find the kerf. With the parts in the position shown in Fig. 2, the screw is rigidly held and may be started into the work. To release the screw, the sleeve 22 may be retracted and this may be accomplished automatically by pulling outwardly on the screw driver handle. The pin 17 will ride in slot 23 until it reaches the upper end thereof and will then slide the sleeve 22 along the sleeve 14 to retracted position and thereby enable expansion of the end of the sleeve 14 and release of the screw. After the screw has been clamped in the attachment, it is obvious that only one hand, that holding the handle, will be needed to start the screw and to release it. The tip of the screw driver may be moved downwardly through the sleeves so that it projects beyond them and the screw turned in the usual manner. There are instances in which it is desirable to grip a screw for its removal by merely pressing downwardly on the screw driver. To perform this function, the sleeve 22 is moved to releasing position as shown in Fig. 4 and sleeve 22 turned so that stop pin 17 rests in keeper 24, thereby providing a bayonet lock or rotary catch coupling the sleeve 22 to shank 11. On pressing the screw driver downwardly into the sleeve 14, the clamping sleeve will be moved downwardly to clamping position. Thus, with the parts in the position shown in Fig. 4 the attachment may be placed over the head of the screw to be removed and then the screw driver pressed downwardly toward the screw. The attachment may also be used as a fishing tool to pick up screws which may be in difficultly accessible places. The sections of the sleeve 14 at the lower end act as jaws which may embrace a screw or like article and the sleeve 22 may then be moved to contract the jaws and grip the article.

In Fig. 5, an auxiliary attachment is shown adapted to take flat or button-head screws. This attachment comprises a collet of resilient metal and externally of the shape of a countersunk screw head and shank. This collet 25 is provided at its lower end with an enlargement 26 having a cavity to receive the screw head. It is slit longitudinally as indicated by 27 so as to be expansible. The screw 28 is inserted in the collet with the head in the enlarged portion. The auxiliary attachment is then placed in the screw holding attachment in the same manner as a screw. The contraction of the auxiliary attachment will grip the screw 28.

It is obvious that our invention is not limited to the conventional type of screw driver but may be used with automatic or spiral tool types or any type having a shank. Bits or tools of a like character having heads may be gripped by the attachment.

What we claim is:—

1. The combination of a screw driver, a lateral stop on the shank thereof; a screw holding attachment comprising an inner sleeve of resilient material mounted on said shank for free sliding movement longitudinally in relation thereto, said inner sleeve being longitudinally slit from its outer end to a point short of its inner end whereby to provide a way for said stop and to be radially expansible at its outer end enabling introduction of the head and shank of a screw into the bore of said inner sleeve, and an outer clamping sleeve slidably mounted over said inner sleeve so as to be disposable to contract said inner sleeve, said outer sleeve having a slot providing a day for said stop whereby the latter may be engaged with the inner end of said slot and the clamping sleeve be retracted from clamping position.

2. The combination of a screw driver, a lateral stop on the shank thereof; a screw holding attachment comprising an inner sleeve of resilient material slidably mounted on said shank, said inner sleeve being longitudinally slit from its outer end to a point short of its inner end whereby to provide a way for said stop and to be radially expansible enabling introduction of the head and shank of a screw into the bore of said inner sleeve and an outer clamping sleeve slidably mounted over said inner sleeve so as to be disposable to contract said inner sleeve, said outer sleeve having a slot providing a way for said stop whereby the latter may be engaged with the inner end of said slot and the clamping sleeve be retracted from clamping position, and a lateral branch in said slot adjacent its inner end to provide a bayonet lock to couple said clamping sleeve to said shank and enable projection to clamping position.

3. The combination of a screw driver, a lateral stop on the shank thereof; a screw holding attachment comprising an inner sleeve of resilient material mounted on said shank for free sliding movement longitudinally in relation thereto, said inner sleeve being longitudinally slit from its outer end to a point short of its inner end whereby to provide a way for said stop and to be radially expansible enabling introduction of the head and shank of a screw into the bore of said inner sleeve, the bore of said inner sleeve being reduced at its outer end for a substantial distance for gripping the shank of a screw to steady the latter, the junction of said reduced and enlarged portions tapering to provide a seat for the screw head, and an outer clamping sleeve slidably mounted over said inner sleeve so as to be disposable to contract said inner sleeve, said outer sleeve having a slot providing a way for said stop whereby the latter may be engaged with the inner end of said slot and the clamping sleeve be retracted from clamping position.

4. The combination of a screw driver, a lateral stop on the shank thereof; a screw holding attachment comprising an inner sleeve of resilient material mounted on said shank for free sliding movement longitudinally in relation thereto, said inner sleeve being longitudinally slit from its outer end to a point short of its inner end whereby to be radially expansible and to provide a way for said stop, said slit being enlarged adjacent its outer end to provide an opening enabling introduction laterally of the head and shank of a screw into the bore of said inner sleeve, and an outer clamping sleeve slidably mounted over said inner sleeve so as to be disposable to contract said inner sleeve and cover said opening, said outer sleeve having a slot providing a way for said stop whereby the latter may be engaged with the inner end of said slot and the clamping sleeve be retracted from clamping position.

5. The combination of a screw driver, a lateral stop on the shank thereof; a screw holding attachment comprising an inner sleeve of resilient material mounted on said shank for free sliding movement longitudinally in relation thereto, said inner sleeve being longitudinally slit from its outer end to a point short of its inner end whereby to be radially expansible and to provide a way for said stop, said slit being enlarged adjacent its outer end to provide an opening enabling introduction laterally of the head and shank of a screw into the bore of said inner sleeve, the bore of said inner sleeve being reduced at its outer end for a substantial distance for gripping the shank of a screw to steady the latter, the junction of said reduced and enlarged portions tapering to provide a seat for the screw head, and an outer clamping sleeve slidably mounted over said inner sleeve so as to be disposable to contract said inner sleeve, said outer sleeve having a slot providing a way for said stop whereby the latter may be engaged with the inner end of said slot and the clamping sleeve be retracted from clamping position.

6. The combination of a screw driver, a lateral stop on the shank thereof; a screw holding attachment comprising an inner sleeve of resilient material slidably mounted on said shank, said inner sleeve being longitudinally slit from its outer end to a point short of its inner end whereby to be radially expansible and to provide a way for said stop, said slit being enlarged adjacent its outer end to provide an opening enabling introduction laterally of the head and shank of a screw into the bore of said inner sleeve, the bore of said inner sleeve being reduced at its outer end for a substantial distance for gripping the shank of a screw to steady the latter, the junction of said reduced and enlarged portions tapering to provide a seat for the screw head, and an outer clamping sleeve slidably mounted over said inner sleeve so as to be disposable to contract said inner sleeve and cover said opening, said outer sleeve having a slot providing a way for said stop whereby the latter may be engaged with the inner end of said slot and the clamping sleeve be retracted from clamping position, and a lateral branch in said slot adjacent its inner end to provide a bayonet lock to couple said clamping sleeve to said shank and enable projection to clamping position.

7. The combination of a screw driver having a shank member; a screw holding attachment comprising an inner sleeve of resilient material slidably mounted on said shank member, said inner sleeve being radially expansible at its outer end enabling introduction of the head and shank of a screw into the bore of said inner sleeve, an outer clamping sleeve member slidably mounted over said inner sleeve so as to be disposable to contract said inner sleeve, a rotary catch between said members including a stop secured to one of said members and slidable longitudinally in relation to said inner sleeve and a lateral keeper in the other member for said stop whereby the latter may be disposed in said keeper for coupling said members in relation to longitudinal movement to enable longitudinal movement of said outer sleeve member relative to said inner sleeve to be effected by said shank member.

8. The combination of a screw driver having a shank member; a screw holding attachment comprising an inner sleeve of resilient material slidably mounted on said shank member, said inner sleeve being longitudinally slit from its outer end to a point short of its inner end whereby to provide a way and to be radially expansible at its outer end enabling introduction of the head and shank of a screw into the bore of said inner sleeve, an outer clamping sleeve member slidably mounted over said inner sleeve so as to be disposable to contract said inner sleeve, a rotary catch between said members including a stop pin secured to one of said members and slidable in said way and a lateral keeper in the other member for said pin whereby the latter may be disposed in said keeper for coupling said members in relation to longitudinal movement to enable longitudinal movement of said outer sleeve member relative to said inner sleeve to be effected by said shank member.

In witness that we claim the foregoing we have hereunto subscribed our names this 11th day of February, 1932.

HOMER C. HUMES.
GEORGE L. ROBINSON.